United States Patent
Gordon et al.

(10) Patent No.: US 10,966,094 B2
(45) Date of Patent: Mar. 30, 2021

(54) MESSAGING SOURCE VERIFICATION METHOD, APPARATUS, AND SYSTEM

(71) Applicant: PROMPT.IO INC., Seattle, WA (US)

(72) Inventors: Philip S. Gordon, Shoreline, WA (US); Scott Fortin, Victoria (CA); Ryan Thomas, Sammamish, WA (US)

(73) Assignee: Prompt.io Inc., Seattle, WA (US)

( * ) Notice: Subject to any disclaimer, the term of this patent is extended or adjusted under 35 U.S.C. 154(b) by 0 days.

(21) Appl. No.: 16/903,050

(22) Filed: Jun. 16, 2020

(65) Prior Publication Data

US 2020/0396615 A1 Dec. 17, 2020

Related U.S. Application Data

(60) Provisional application No. 62/862,546, filed on Jun. 17, 2019.

(51) Int. Cl.
*H04M 1/66* (2006.01)
*H04W 12/10* (2021.01)
*H04W 4/12* (2009.01)
*H04W 12/06* (2021.01)
*H04W 8/26* (2009.01)

(52) U.S. Cl.
CPC ......... *H04W 12/1008* (2019.01); *H04W 4/12* (2013.01); *H04W 8/26* (2013.01); *H04W 12/06* (2013.01); *H04W 12/1006* (2019.01)

(58) Field of Classification Search
CPC ............. H04W 12/06; H04W 12/0602; H04W 12/0605; H04W 12/0608
See application file for complete search history.

(56) References Cited

U.S. PATENT DOCUMENTS

| | | | |
|---|---|---|---|
| 10,021,114 B1 * | 7/2018 | Liu | H04L 51/046 |
| 2004/0260778 A1 | 12/2004 | Banister et al. | |
| 2005/0055404 A1 | 3/2005 | Kitchen | |
| 2005/0076216 A1 * | 4/2005 | Nyberg | H04L 9/0844 713/171 |
| 2006/0036727 A1 | 2/2006 | Kurapati et al. | |
| 2006/0271631 A1 | 11/2006 | Qureshi et al. | |
| 2009/0089583 A1 * | 4/2009 | Patel | H04L 9/3242 713/171 |
| 2010/0146263 A1 * | 6/2010 | Das | G06Q 20/425 713/155 |
| 2011/0270748 A1 | 11/2011 | Graham, III et al. | |
| 2017/0310685 A1 * | 10/2017 | Zhao | H04W 12/0608 |
| 2018/0046856 A1 | 2/2018 | Kapczynski | |
| 2018/0091453 A1 | 3/2018 | Jakobsson | |

OTHER PUBLICATIONS

Copenheaver, Blaine R, International Search Report and Written Opinion, dated Aug. 28, 2020, PCT/US2020/037945, ISA/US.

* cited by examiner

*Primary Examiner* — Shantell L Heiber
(74) *Attorney, Agent, or Firm* — Æon Law; Adam L. K. Philipp; Martin Spencer Garthwaite

(57) ABSTRACT

Methods, apparatus, and system to verify the source of a suspect message, so that it is no longer suspect.

20 Claims, 7 Drawing Sheets

MESSAGING SOURCE VERIFICATION METHOD, APPARATUS, AND SYSTEM

CROSS-REFERENCE TO RELATED APPLICATIONS

The present application is a non-provisional of, claims the benefit of the filing date of, and incorporates by this reference the subject matter of U.S. provisional patent application No. 62/862,546 filed Jun. 17, 2019.

FIELD

The present disclosure relates to one or more computing devices and, in particular to, one or more computing devices to enable a message recipient to verify the source of a message.

BACKGROUND

Messaging is computer-aided communication in which users send and receive electronic messages, generally to one another. Software running on desktop computers, mobile devices, and servers facilitates messaging. For example, end-user software programs or "apps" may allow end-users to compose and send messages, either directly to one another (such as in peer-to-peer systems) or to one another through a server, wherein the server executes software to receive, store, and route the messages. Messages can consist of text, internet hyperlinks, pictures, files, and the like.

Some of the software facilitating messaging services allow messages to be sent by an individual or organization (message sender) to another individual or organization (message recipient) in an unsolicited manner. It is possible for message senders to engage in a range of communication behaviors that message recipients may find undesirable. For example, some message senders send messages or place phone calls which use or which "spoof" an area code known to a message recipient, in order to obtain the attention of the message recipient and/or to prey upon credibility which the message recipient may ascribe to the area code. For example, some message senders pretend to be known to or trusted by a message recipient in order to implement a phishing attack on the message recipient.

In many cases, there may be inadequate ways for the message recipient to verify which person or organization a message originated from, which, for the message recipient, can lead to suspicion regarding a message or message sender and with respect to receipt of messages in general. For example, in the context of text messages, a message recipient may only have a phone number to identify the message sender. Even if a message recipient desires to receive a message from a particular message sender, the phone number may not provide the message recipient with information regarding whether the message sender was the one whom the message recipient wanted to communicate with. The message recipient may be confused and anxious regarding whether to view the message instance. The message recipient may engage in inefficient and unproductive attempts to connect the phone number with an earlier contact or with "legitimate" or "spammy" phone numbers, as may be identified through Internet search results, which may, themselves, be unreliable or manipulated.

Inability to verify message senders leaves message recipients susceptible to phishing scams and other dubious activities and causes anxiety to message recipients.

DETAILED DESCRIPTION

Figure 1:
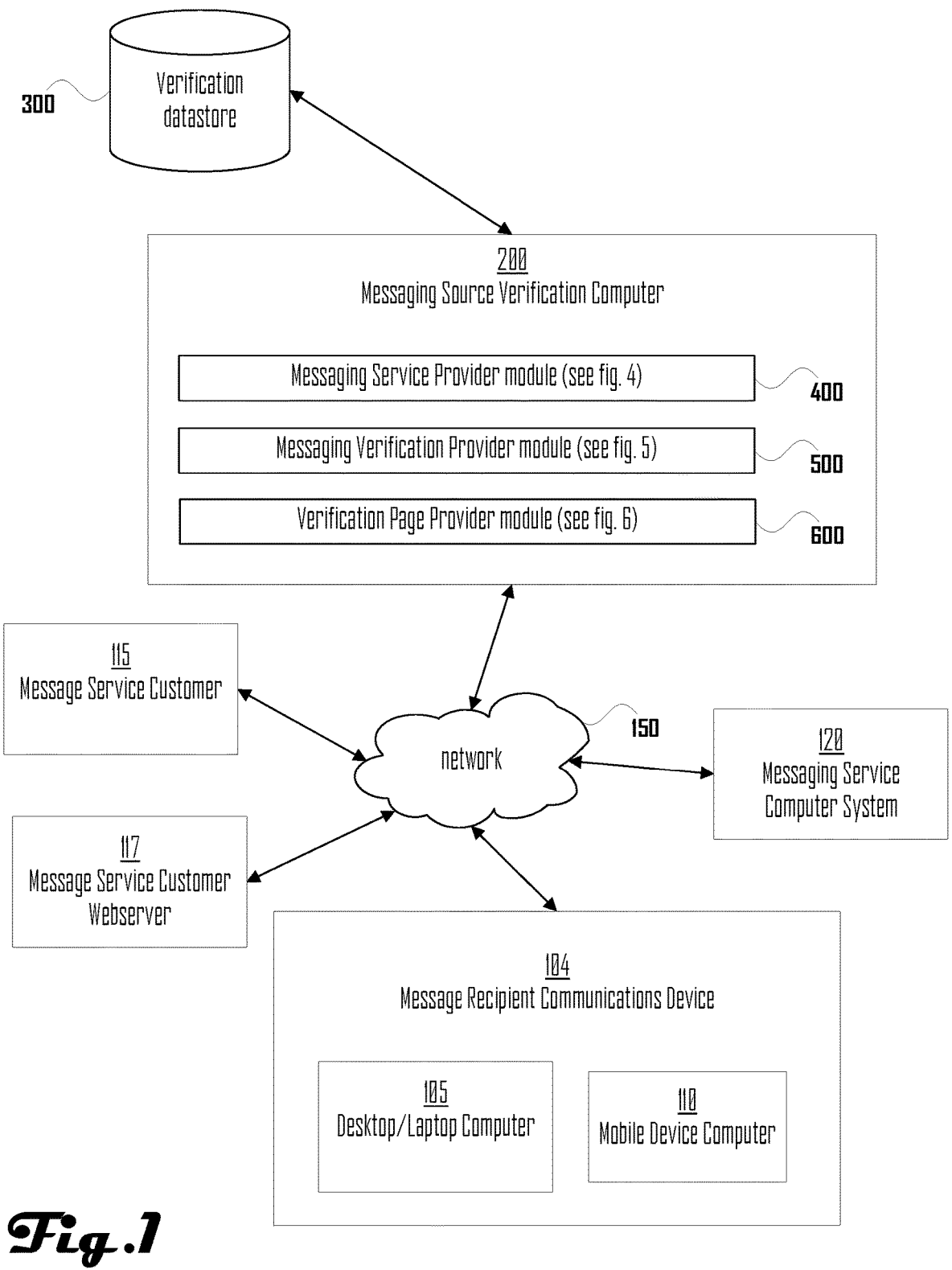
FIG. 1 is a network and device diagram illustrating an example of a messaging source verification computer device, a desktop/laptop computer device, a mobile device, and a network incorporated with teachings of the present disclosure, according to some embodiments.

Following are defined terms in this document.

As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a "channel" is a communication channel for a source message and a user in the communication channel. A "channel" may be associated with one or more media used by a messaging application, like text, audio, or video. For example, if a source message is sent via short message service (SMS) text message, "channel" refers to a telephone system which allows transmission of SMS text messages to phone numbers and to the telephone number of a user within the SMS system who transmits such messages. For example, if a source messages is sent via a messaging application, such as Facebook Messenger or WhatsApp, which also includes a user identifier; in this instance, the "channel" may be the messaging application and a user associated with a user identifier.

As used herein, a process corresponds to an instance of a program, e.g., an application program, executing on a processor and a thread corresponds to a portion of the process. A processor may include one or more execution core(s). The processor may be configured as one or more socket(s) that may each include one or more execution core(s).

As used herein, a "message recipient" refers to an entity (individual or organization) that may receive a message from a user or customer of messaging service provider module 400. This entity can be any individual or business that is accessible by the message service provider; e.g. anyone with a phone that can receive SMS Text messages or anyone with an account on a messaging application such as Facebook Messenger or WhatsApp FIG. 1 is a network and device diagram illustrating an example of messaging source verification computer 200 ("messaging source verification computer 200"), and messaging source verification computer datastore 300 ("verification datastore 300"), message recipient 104, who may be using desktop/laptop computer 105 and/or mobile device computer 110, messaging service customer 115, messaging service customer webserver 117, messaging service computer 120, and network 150, according to some embodiments.

Figure 2:
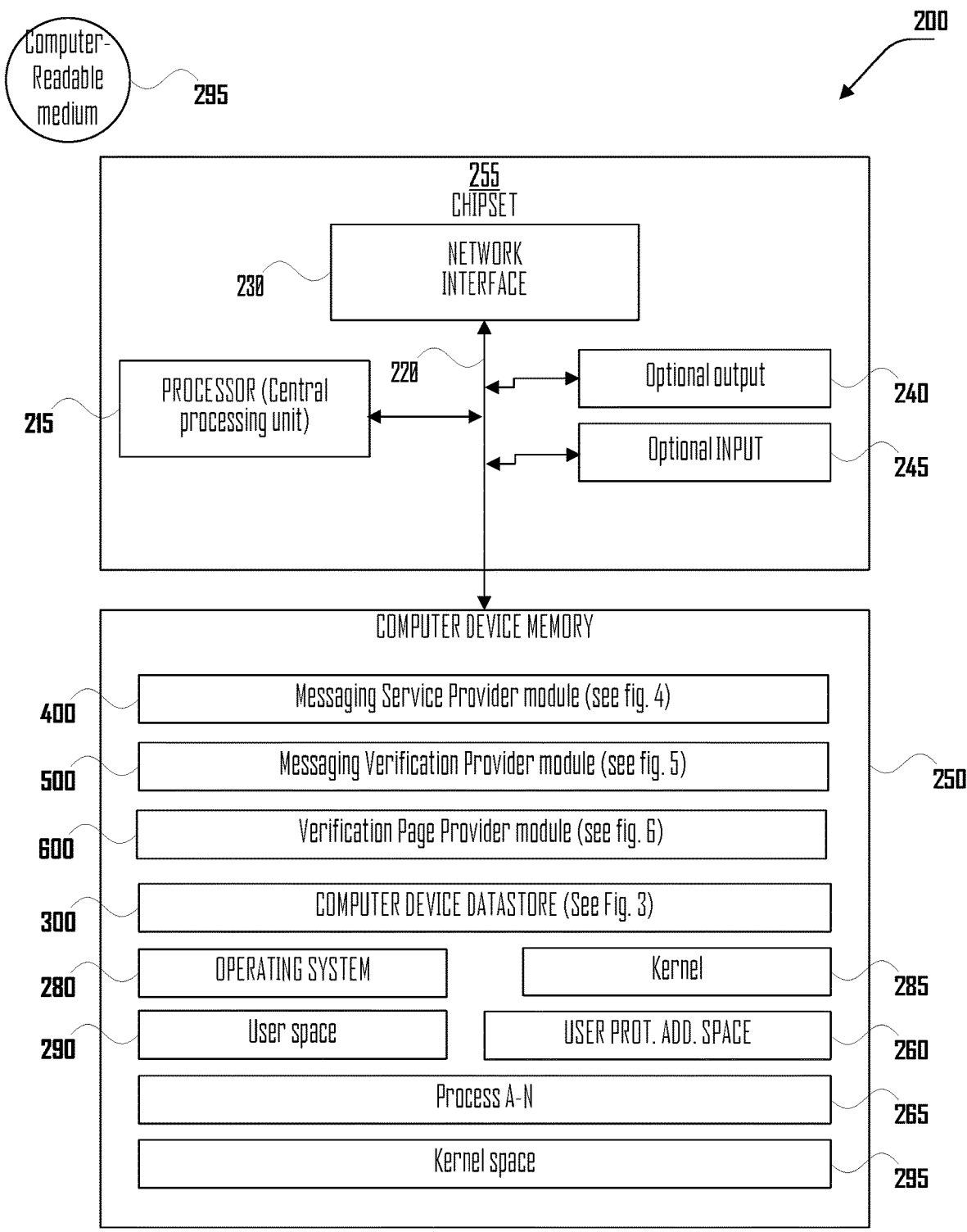
FIG. 2 is a functional block diagram illustrating an example of the messaging source verification computer device of FIG. 1, incorporated with teachings of the present disclosure, according to some embodiments.

As illustrated in FIG. 1, messaging source verification computer 200, described further in relation to FIG. 2, may be connected with verification datastore 300 and network 150 and may comprise messaging service provider module 400, messaging verification provider module 500, and verification page provider module 600, discussed further herein. Together, messaging service provider module 400, messaging verification provider module 500, and verification page provider module 600 may be referred to as "message verification module".

In overview, this disclosure relates to an apparatus and methods performed by and in a messaging source verification computer device apparatus or system, such as messaging source verification computer 200 and other computer devices illustrated in FIG. 1, to send one or more messages by or on behalf of, for example, a customer or user of messaging source verification computer 200 ("messaging system customer" or "message sender"), such as message service customer 115. The messages may be sent to a communications device of a message recipient, such as message recipient communications device 104. Message recipient may use, for example, a desktop or laptop computer, such as desktop/laptop computer 105 and/or a mobile computer device, such as mobile computer device 110. Mobile computer device 110 may be, for example, a mobile phone, including a smartphone. Message recipient communications device 104 may allow message recipient to connect to communications media, such as messaging service computer system 120, and receive messages. Messaging service computer 120 may provide, for example, communication services which allow transmission of text, audio, video, and computer programs between or among users thereof. For example, messaging service computer 120 may provide text messaging and/or multimedia messaging, such as audio, video and computer program messaging. Messaging service computer 120 may assign or allocate, for example, phone numbers or user identifiers or other login or use credentials to users of messaging service computer 120.

Message recipient may not be able to identify the source or sender of messages sent to message recipient and/or the motivation behind a message. Such messages may be referred to herein as "suspect messages". In cases, message recipient may wish to receive messages from a message sender, but may not be able to identify the message sender from the message or may have forgotten that message recipient had agreed to receive messages from the message sender. Suspect messages may cause message recipient anxiety; message recipient may spend time and resources trying to confirm whether or not message recipient wanted to receive a particular message.

Messaging source verification computer device apparatus or system may help the message sender and message recipient verify the source of one or more messages, so that it or they are no longer suspect.

The messaging source verification computer device apparatus or system may include one or more computer devices, including one or more computer devices operated by the same or separate organizations. Modules of the messaging source verification computer device apparatus or system may be within one computer device, operated by one organization, or may be distributed across multiple computer devices, including multiple computer devices operated by the same or by separate organization.

The messaging source verification computer device apparatus may provide a convenient and verifiable way to allow message recipient to verify the source of a message from message sender. For example, the message may comprise a predetermined keyword, such as "ID" and an invitation to confirm the identify of the message sender. The message recipient may reply to the message with a reply message containing the keyword. Receipt of the reply message and keyword by the messaging source verification computer device apparatus may cause transmission of a second message from the message sender, wherein the second message may comprise instructions and a code to use to verify the source of the suspect messages. The instructions may instruct the message recipient to navigate to a trusted page; this may not be a link that the message recipient can click on, as this is susceptible to other spoofing. For example, the second message may say, "visit the home page of Acme Corp, click on the verify link, and type in this code: 54354A".

If message recipient follows these instructions, messaging source verification computer device apparatus may cause information to be displayed, such as on a page accessible at the "verify link", which information will allow the message recipient to see information that reassures them the company website they just visited and entered the code at is the source of the suspect message. Once the source has been verified, messages from the message sender may be recognized and may no longer be suspect messages.

In FIG. 1, messaging source verification computer 200 is illustrated as connecting to verification datastore 300. Verification datastore 300 is described further herein, though, generally, should be understood as a datastore used by messaging source verification computer 200.

Network 150 may comprise computers, network connections among the computers, and software routines to enable communication between the computers over the network connections. Examples of Network 150 comprise an Ethernet network, the Internet, and/or a wireless network, such as a GSM, TDMA, CDMA, EDGE, HSPA, LTE or other network provided by a wireless service provider. Connection to Network 150 may be via a Wi-Fi connection. More than one network may be involved in a communication session between the illustrated devices. Connection to Network 150 may require that the computers execute software routines which enable, for example, the seven layers of the OSI model of computer networking or equivalent in a wireless phone network.

FIG. 2 is a functional block diagram illustrating an example of messaging source verification computer 200, incorporated with teachings of the present disclosure, according to some embodiments. Messaging source verification computer 200 may include chipset 255. Chipset 255 may include processor 215, input/output (I/O) port(s) and peripheral devices, such as output 240 and input 245, and network interface 230, and computer device memory 250, all interconnected via bus 220. Network interface 230 may be utilized to form connections with network 150, with verification datastore 300, or to form device-to-device connections with other computers.

Chipset 255 may include communication components and/or paths, e.g., buses 220, that couple processor 215 to peripheral devices, such as, for example, output 240 and input 245, which may be connected via I/O ports. Processor 215 may include one or more execution cores (CPUs). For example, chipset 255 may also include a peripheral controller hub (PCH) (not shown). In another example, chipset 255 may also include a sensors hub (not shown). Input 245 and output 240 may include, for example, user interface device(s) including a display, a touch-screen display, printer, keypad, keyboard, etc., sensor(s) including accelerometer, global positioning system (GPS), gyroscope, etc., communication logic, wired and/or wireless, storage device(s) including hard disk drives, solid-state drives, removable storage media, etc. I/O ports for input 245 and output 240 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Computer device memory 250 may generally comprise a random access memory ("RAM"), a read only memory ("ROM"), and a permanent mass storage device, such as a disk drive or SDRAM (synchronous dynamic random-access memory). Computer device memory 250 may store program code for modules and/or software routines, such as, for example, hardware acceleration module 210, verification datastore 300 (illustrated and discussed further in relation to FIG. 3), messaging service provider module 400 (illustrated and discussed further in relation to FIG. 4), messaging verification provider module 500 (illustrated and discussed further in relation to FIG. 5), and verification page provider module 600 (illustrated and discussed further in relation to FIG. 6).

Computer device memory 250 may also store operating system 280. These software components may be loaded from a non-transient computer readable storage medium 295 into computer device memory 250 using a drive mechanism associated with a non-transient computer readable storage medium 295, such as a floppy disc, tape, DVD/CD-ROM drive, memory card, or other like storage medium. In some embodiments, software components may also or instead be loaded via a mechanism other than a drive mechanism and computer readable storage medium 295 (e.g., via network interface 230).

Figure 3:
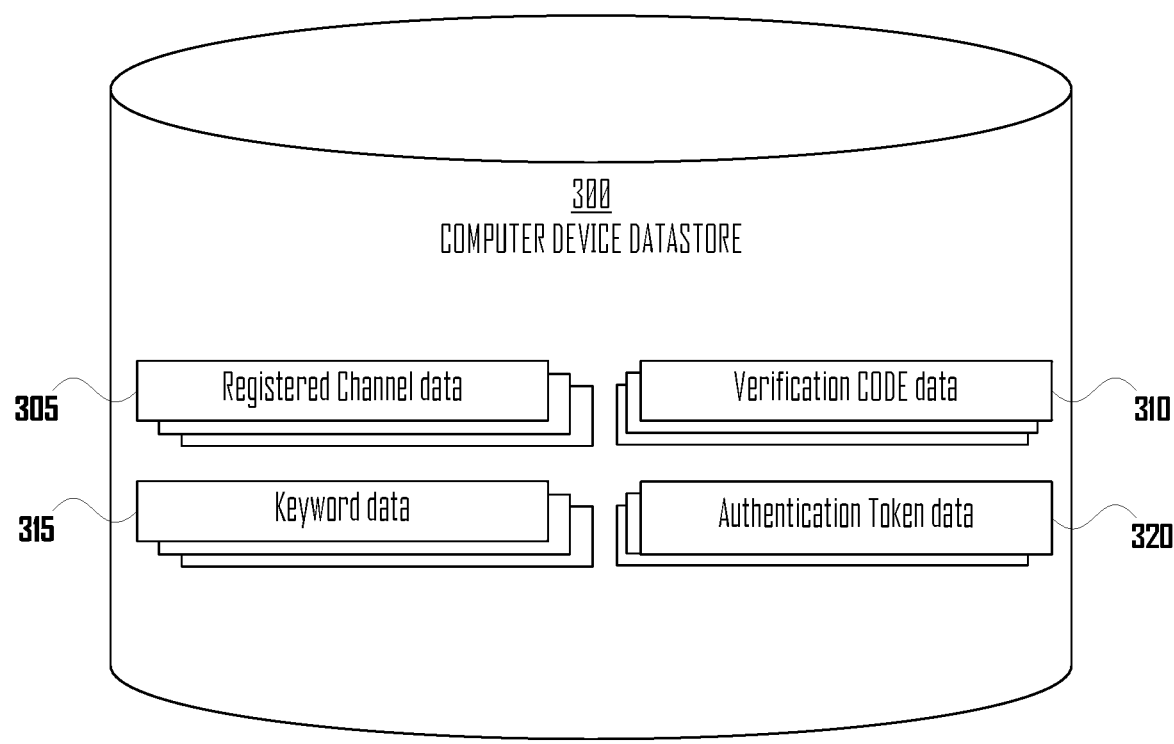
FIG. 3 is a functional block diagram illustrating an example of a messaging source verification computer device datastore incorporated with teachings of the present disclosure, consistent with embodiments of the present disclosure.

Computer device memory 250 is also illustrated as comprising kernel 285, kernel space 295, user space 290, user protected address space 260, and verification datastore 300 (illustrated and discussed further in relation to FIG. 3).

Computer device memory 250 may store one or more process 265 (i.e., executing software application(s)). Process 265 may be stored in user space 290. Process 265 may include one or more other process 265a . . . 265n. One or more process 265 may execute generally in parallel, i.e., as a plurality of processes and/or a plurality of threads.

Computer device memory 250 is further illustrated as storing operating system 280 and/or kernel 285. The operating system 280 and/or kernel 285 may be stored in kernel space 295. In some embodiments, operating system 280 may include kernel 285. Operating system 280 and/or kernel 285 may attempt to protect kernel space 295 and prevent access by certain of process 265a . . . 265n.

Kernel 285 may be configured to provide an interface between user processes and circuitry associated with messaging source verification computer 200. In other words, kernel 285 may be configured to manage access to processor 215, chipset 255, I/O ports and peripheral devices by process 265. Kernel 285 may include one or more drivers configured to manage and/or communicate with elements of messaging source verification computer 200 (i.e., processor 215, chipset 255, I/O ports and peripheral devices).

Messaging source verification computer 200 may also comprise or communicate via bus 220 and/or network interface 230 with verification datastore 300, illustrated and discussed further in relation to FIG. 3. In various embodiments, bus 220 may comprise a high speed serial bus, and network interface 230 may be coupled to a storage area network ("SAN"), a high speed wired or wireless network, and/or via other suitable communication technology. messaging source verification computer 200 may, in some embodiments, include many more components than as illustrated. However, it is not necessary that all components be shown in order to disclose an illustrative embodiment.

FIG. 3 is a functional block diagram of the messaging source verification computer datastore 300 illustrated in the computer device of FIG. 2, according to some embodiments. The components of messaging source verification datastore 300 may include data groups used by modules and/or routines, e.g, registered channel data 305, verification code data 310, keyword data 315, and authentication token data 320 (to be described more fully below). The data groups used by modules or routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

The components of messaging source verification computer datastore 300 are discussed further herein in the discussion of other of the Figures.

Figure 4:
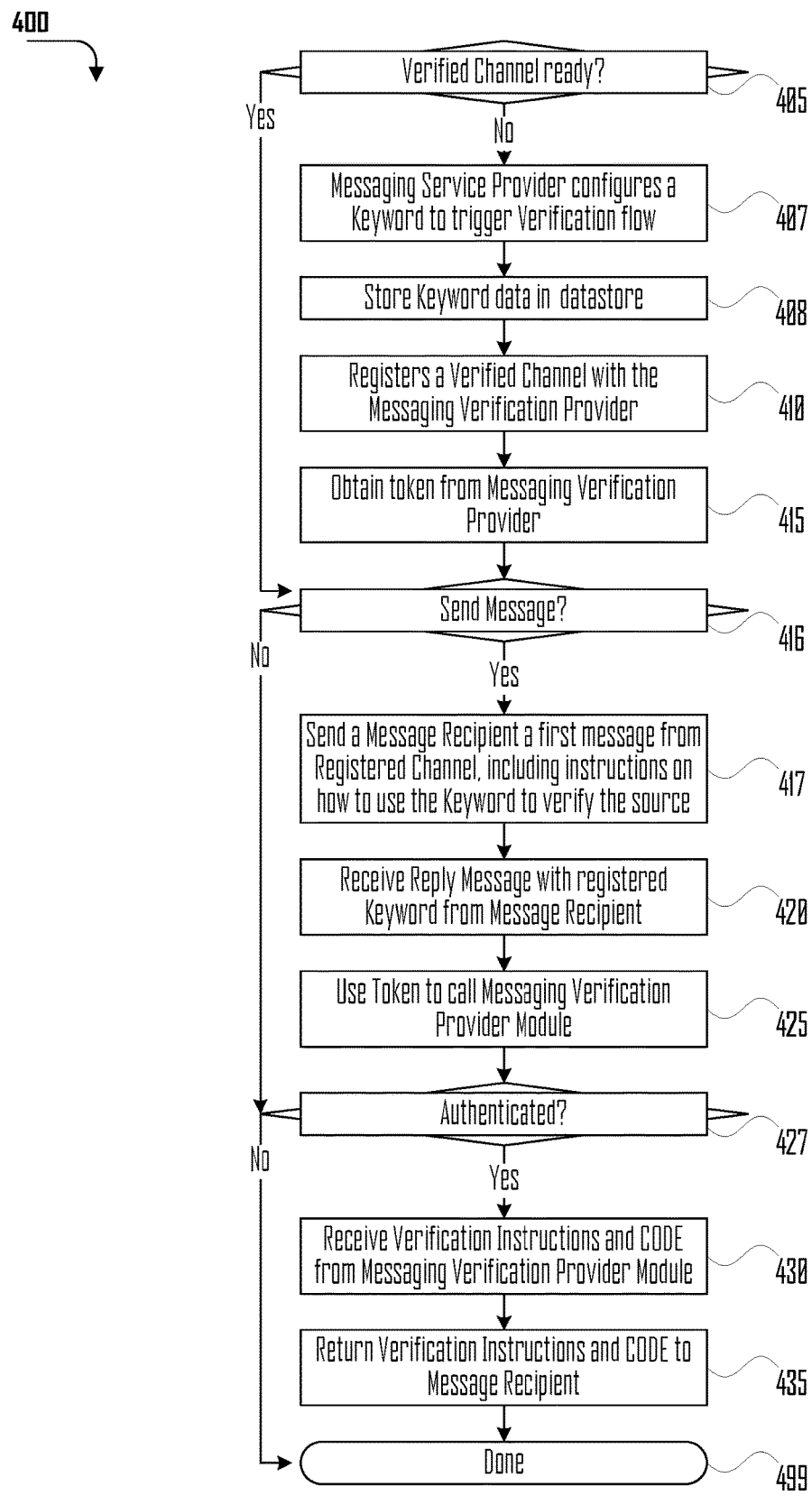
FIG. 4 is a flow diagram illustrating an example of a method performed by a messaging service provider module, according to some embodiments.

FIG. 4 is a flow diagram illustrating an example of messaging service provider module 400 which may be performed by computer device(s), such as messaging source verification computer 200, according to some embodiments. In overview, messaging service provider module 400 provides a messaging service to a message sender and interfaces with messaging verification provider module 500, wherein messaging verification provider module 500 may further interface with verification page provider module 600. This message sender is a user or customer of the message service provider, such as message service customer 115, and may use messaging services provided or directed by message service provider service to send messages to one or more message recipients.

At block 405, messaging service provider module 400 may have a new user or customer, may be reviewing existing customers of messaging service provider module 400, or may be preparing itself for new users or customers; at block 405, messaging service provider module 400 may determine whether a verified channel is ready to be used by or for the new or existing message sender. As used herein, a "channel" is a communication channel for a source message and a user in the communication channel and a "verified channel" is a "channel" which has been verified for use to send messages to a message recipient, as described herein.

At block 407, messaging service provider module 400 may itself or may have a user or customer of the messaging service provider module (message sender) select and/or configure a keyword that will trigger the messaging verification flow when the keyword is sent back by the message recipient in a reply message, as described further herein. The keyword may need to conform to requirements of a messaging service, such as using allowed characters or being of or shorter than an allowed length. The keyword may be for example, "ID" or another keyword selected by one or more of messaging service provider module 400, the message sender, or the like. Block 407 may occur before transmission of a message by a message sender or receipt of the "suspect" message by the message recipient, so that messaging service provide module 400 is ready when message sender desires to send and message recipient desires to verify a suspect message.

At block 408, messaging service provider module 400 may store the generated keyword in, for example, one or more keyword data 315 records.

Figure 5:
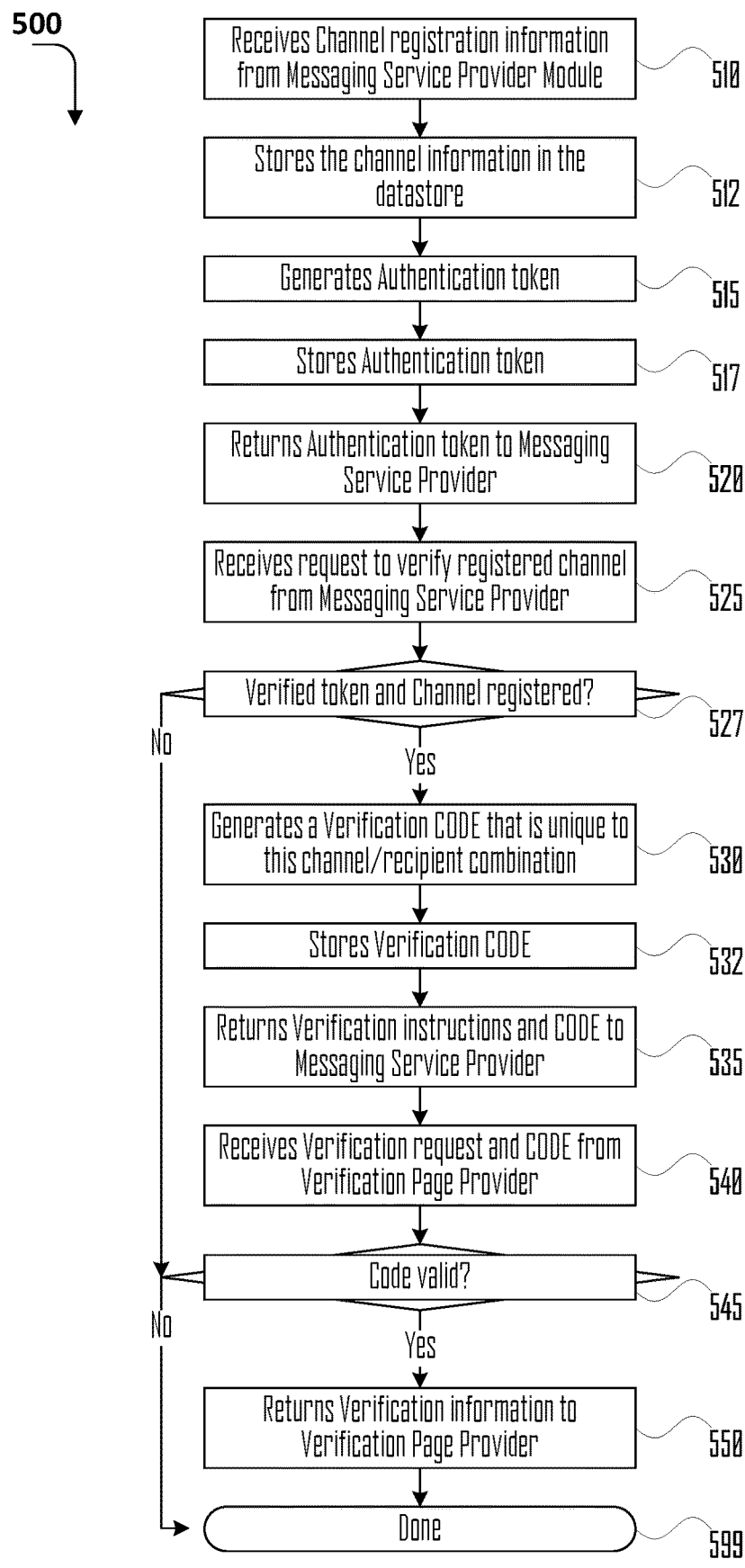
FIG. 5 is a flow diagram illustrating an example of a method performed by a messaging verification provider module, according to some embodiments.

At block 410, messaging service provider module 400 may register a verified channel with the messaging verification provider module 500, as described further herein with respect to FIG. 5. Block 410 may comprise messaging service provider module 400 sending channel information for the verified channel to messaging verification provider module 500 in a request to register the verified channel. The request may comprise a request for an authentication token to use in relation to authentication of messages sent to message recipient using the verified channel. The channel information for the verified channel may comprise, for example, a phone number or identifier assigned to a user in a messaging communication media, such as a text, SMS, audio, visual, or software programming communication media. The channel information may further comprise or be associated with information regarding how or where a message recipient is to enter a verification code, such as, "home page of Acme Corp".

At block 415, messaging service provider module 400 may obtain an authentication token from messaging verification provider module 500. Messaging service provider module 400 may call messaging verification provider module 500 and use the authentication token to authenticate itself and/or the verified channel used to send a message to the message recipient. An authentication token is just one possible implementation. Other implementations might include a username and password, Basic Authentication, OAuth or other solutions.

At block 416, messaging service provider module 400 may determine whether it is to send a message to a message recipient using the verified channel on behalf of the message sender. This determination may be based on, for example, whether the message sender has sent messaging service provider module 400 an instruction to send a message to a message recipient using the verified channel. Such an instruction may include content provided by the message sender, wherein the content is to be included in the message to the message recipient.

At block 417, messaging service provider module 400 may connect to a messaging service, such as messaging service computer system 120, and send a message to the message recipient. This message may be a first message sent by messaging service provider module 400 on behalf of or by the message sender on this verified channel since the verified channel was registered with the message verification provider module 500. The message may be generated in response to the outcome of decision block 416. The message may include content provided by the user or customer of messaging service provider module 400. The message recipient may consider this message suspect if they do not recognize the source of this message; i.e., the message is an SMS text message sent using a phone number and the message recipient does not recognize the phone number (or sender Id if the message was sent using another service like Facebook Messenger). This first, possibly suspect, message will include details for the message recipient regarding how to use the keyword that has been configured in block 407 and stored in keyword data 315 record, to verify the source of this suspect message.

For example, this message may contain text such as, for example, content provided by the user or customer of messaging service provider module 400 as well as text which says, for example, "Reply 'ID' to confirm the identity of the sender of this message", "Reply 'Stop' to stop receiving messages", etc. In this example, "ID" may be the keyword configured in block 407. The text, "Reply 'ID' to confirm the identity of the sender of this message" may be the details provided by messaging service provider module 400 to the message recipient regarding how to use the keyword to verify the source of this suspect message.

At block 420, messaging service provider module 400 may receive a reply message from the message recipient, after message recipient received the message of block 417. The reply message may have been sent by the message recipient because the message recipient considers the message sent in block 417 suspect and wants to verify it is from a reputable source. The reply message may comprise the configured keyword previously stored in keyword data 315 records.

At block 425, messaging service provider module 400 may lookup the authentication token received at block 415, which authentication token may be associated with the verified channel, as may be indicated in the reply message, and may call the messaging verification provider module 500 and request that messaging verification provider module 500 confirm that the purported verified channel is actually registered as a verified channel.

At block 427, messaging service provider module 400 may determine whether the authentication token is associated with the verified channel, such as according to a response from messaging verification provider module 500.

If affirmative or equivalent at block 430, messaging service provider module 400 may receive confirmation that the authentication token is associated with the verified channel and may also receive verification instructions and a verification code from messaging verification provider module 500.

At block 435, messaging service provider module 400 may return the verification instructions and verification code to the message recipient. This would be the 2nd message the message recipient has now received from the suspect source, but now they have a way to verify these suspect messages are from a reputable source. For example, the second message may say, "visit the home page of Acme Corp, click on the verify link, and type in this code: 54354A".

At block 499, which may follow decision block 416 or 427 if negative or equivalent, or which may follow block 435, messaging service provider module 400 may conclude and/or return to a module and/or another process which may have called it.

FIG. 5 is a flow diagram illustrating an example of messaging verification provider module 500 which may be performed by computer device(s), such as messaging source verification computer 200 or other computer device, according to some embodiments. In overview, messaging verification provider module 500 handles registration of a channel as a verified channel, verification of the verified channel, after it is used, and integration with verification page provider module 600, which may provide information to the message recipient to assist in informing the message recipient that a message is not suspect.

At block 510, messaging verification provider module 500 may receive channel registration information (or "channel information") from, for example, messaging service provider module 400.

At block 512, the received channel registration information may be stored in, for example, one or more registered channel data 305 records. The channel registration information may comprise, for example, an identifier of a channel, a channel number, a channel name, a user of the channel, a name of a company which is registering the verified channel. For example, the channel registration information may comprise a phone number which may be used to send text messages in a text messaging system.

At block 515, messaging verification provider module 500 may generate an authentication token. The authentication token may be arbitrarily associated with the channel registration information or the authentication token may encode the channel registration information through an encoding process. For example, the encoding process may be one-way, two-way, lossy, or lossless.

At block 517, the generated authentication token data may be stored in, for example, one or more authentication token data 320 records. An authentication token is just one possible implementation for the messaging server provider module 400 to use to authenticate when calling the messaging verification provider module 500. Other implementations might include a username and password, Basic Authentication, OAuth or other solutions. The generated authentication token may be associated with and/or may be derivable from channel information of the verified channel.

At block 520, messaging verification provider module 500 may return the authentication token stored in block 320 to the messaging service provider module 400. Alternatively, the authentication token stored in block 320 may be accessible to messaging service provider module 400 through datastore 300.

At block 525, messaging verification provider module 500 may receive a request to verify a verified channel from messaging service provider module 400. The request may include an authentication token associated with a verified channel. The messaging service provider module 400 may be sending this request to the messaging verification provider module 500 because messaging service provider module 400 sent a message to the message recipient in a verified channel, which message the message recipient may believe is suspect, and messaging service provider module 400 received a reply from the message recipient, which reply message is trying to verify whether the source is reputable. E.g., the message from messaging service provider module 400 to the message recipient may have said, "Reply 'ID' to confirm the identity of the sender of this message" and the message recipient replied with "ID" to the message. They reply may include, reference, or be associated with the verified channel and/or with the authentication token.

At decision block 527, messaging verification provider module 500 may determine whether the authentication token is verified with respect to the verified channel used to send the message to the message recipient. For example, messaging verification provider module 500 may determine whether the authentication token is associated with the purported verified channel or can be derived from channel information of the purported verified channel. At decision block 527, messaging verification provider module 500 may determine whether the purported verified channel is registered as a verified channel, such as by reference to one or more channel data 305 records.

At block 530, messaging verification provider module 500 may generate a verification code that is unique to this channel/message recipient combination. At block 532, the generated verification code data may be stored in, for example, one or more verification code data 310 records. E.g., the verification instructions and verification code may recite, for example, "visit the home page of Acme Corp, click on the verify link, and type in this code: 54354A".

At block 535, messaging verification provider module 500 may return verification instructions and the verification code stored in the verification code data 310 records to the messaging service provider module 400.

At block 540, messaging verification provider module 500 may receive verification request and code from verification page provider module 600.

At decision block 545, messaging verification provider module 500 may determine whether the supplied verification code matches the one stored in the verification code data 310 records.

If affirmative or equivalent at decision block 545, at block 550, messaging verification provider module 500 may return the verification information to the verification page provider module 600.

At block 599, which may follow decision block 527 or 545 if negative or equivalent, messaging verification provider module 500 may return, conclude and/or may return to a process which may have spawned or called it.

Figure 6:
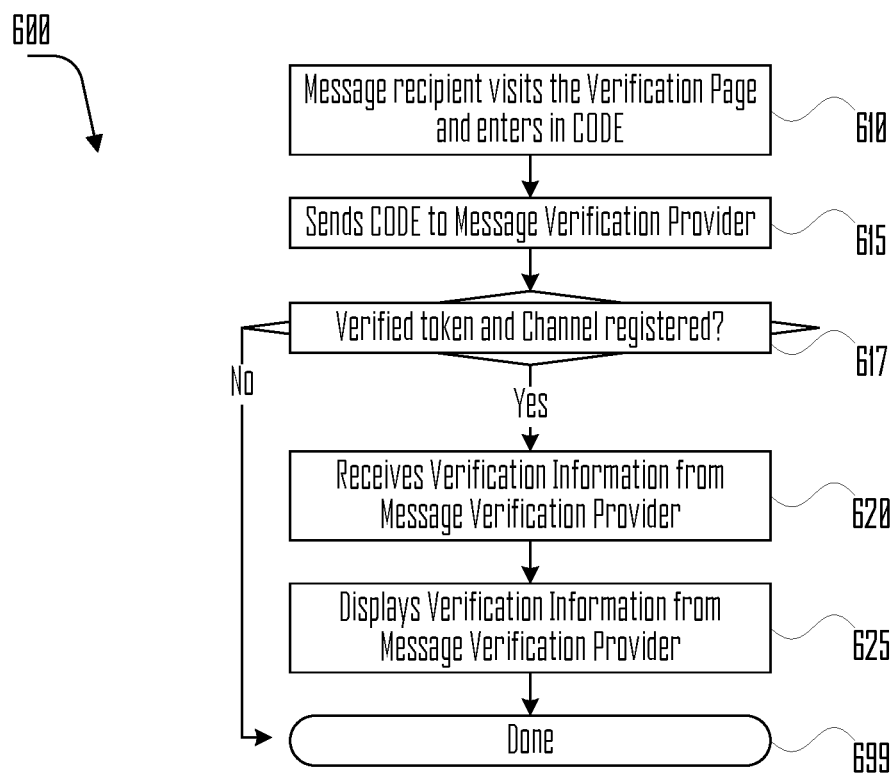
FIG. 6 is a flow diagram illustrating an example of a method performed by a verification page provider module, according to some embodiments.

FIG. 6 is a flow diagram illustrating an example of verification page provider module 600 which may be performed by computer device(s), such as messaging source verification computer 200 or other computer device, according to some embodiments. In overview, verification page provider module 600 may verify a channel is a verified channel and display results thereof to the message recipient.

At block 610, a message recipient who has received a "suspect" message or another party visits a verification page and enters a verification code, such as following block 550 in messaging verification provider module 500. The verification page may be made available by, for example, message sender at a URL or domain a domain name of such customer or user.

At block 615, verification page provider module 600 may send the verification code to the message verification provider module 500.

At block 617, verification page provider module 600 may determine whether the message verification provider module 500 verified the verification code. This determination may be based, for example, on whether message verification provider module 500 returns verification information and/or another confirmation.

At block 620, verification page provider module 600 may receive verification information (or "summary information")

from the message verification provider module 500. Verification information or summary information may comprise, for example the date-time when messages were sent to or from the message recipient, the sender's identifier, and the like.

At block 625, verification page provider module 600 may display the verification information received from the message verification provider module 500 on the verification page. Because the verification page may be maintained by the message sender, e.g. the customer or user of messaging service provider module 400, display on the verification page may be accomplished by transmission to a webserver of such message sender, such as to message service customer webserver 117, or by linking to a webserver of verification page provider module 600 by message service customer webserver 117. This should verify the source of the suspect messages, thus removing the suspect nature of those messages.

At block 699, verification page provider module 600 may return, conclude and/or may return to a process which may have spawned or called it.

Figure 7:
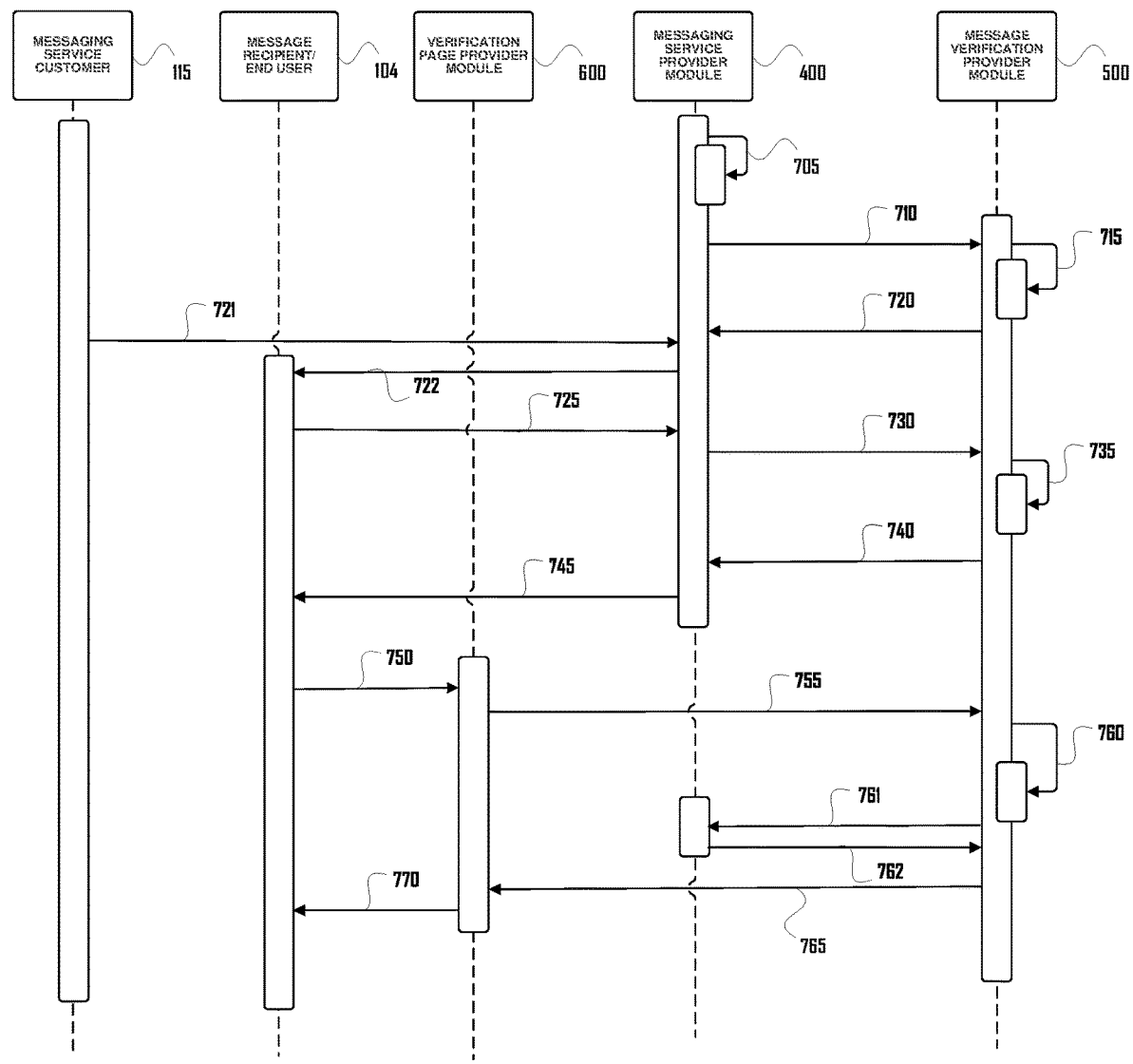
FIG. 7 is a data sequence diagram illustrating an example of a sequence of events performed by a message source verification computer, according to some embodiments.

FIG. 7 is a data sequence diagram illustrating an example of a sequence of communication events performed by or among one or more messaging service customer 115, message recipient 104, verification page provider module 600, messaging service provider module 400, and message verification provider module 500.

At block 705, messaging service provider module 400 may generate an instruction to register a verified channel for use to send messages to a message recipient, such as according to blocks 405 to 408 of FIG. 4. This may comprise, for example, configuring a keyword to trigger a verification flow and storing the keyword in datastore 300. The keyword may be, for example, "ID" or the like.

At block 710, messaging service provider module 400 may transmit a request to messaging verification provider module 500 to register a verified channel with messaging verification provider module 500, such as according to block 410 of FIG. 4. The request may comprise a request for an authentication token to use in relation to authentication of messages sent to a message recipient in the verified channel. The request may comprise channel information for the verified channel, such as a phone number or identifier assigned to a user of a messaging communication media, such as a text or SMS communication media. An authentication token is just one possible implementation to authenticate messages sent to the message recipient. Other implementations might include a username and password, Basic Authentication, OAuth or other solutions. The channel information may further comprise a domain name, URL, or other contact information of the message sender at which a message recipient is to enter a verification code (discussed herein).

At block 715, messaging verification provider module 500 may generate an authentication token. The authentication token may be associated with the verified channel and/or the authentication token may be derivable from channel information of or for the verified channel. The authentication token may be stored in, for example, one or more authentication token data 320 records.

At block 720, messaging verification provider module 500 may return the authentication token to the messaging service provider module 400.

At block 721, a messaging service customer, such as messaging service customer 115, may send an instruction to messaging service provider module 400, wherein the instruction tells messaging service provider module 400 to send a message to a message recipient, such as message recipient 104, in the verified channel. The instruction may include content provided or linked to by the messaging service customer or message sender, wherein the content is to be included in the message to the message recipient.

At block 722, messaging service provider module 400 may send the first message it has ever sent to a particular message recipient on this channel since it was registered with message verification provider module 500. The message may include the content provided or linked to by the message sender as well as the keyword of block 705, e.g. "ID". The message recipient may consider this message suspect if they do not recognize the source of this message; e.g. the message recipient may not know the phone number if the message was an SMS text message or may not recognize the sender identifier, if the message was in a messaging app like Facebook Messenger. This first, possibly suspect message (from the perspective of the message recipient), will include details for the message recipient regarding how to use the keyword that has been configured in block 705 and stored in keyword data 315 record, to verify the source of this suspect message. E.g., this message may recite, "Reply 'ID' to confirm the identity of the sender of this message".

At block 725, messaging service provider module 400 may receive a reply message from the message recipient that has received the message of block 722. This reply message from the message recipient may comprise the keyword previously stored in keyword data 315 records because the message recipient does consider the first message sent in block 722 suspect and wants to verify it is from a reputable source.

At block 730, messaging service provider module 400 may lookup an authentication token associated with or derivable from the channel and user of the message of block 722, for example, and, if one is found, present the authentication token received at block 720 when messaging service provider module 400 calls the messaging verification provider module 500 to ensure the channel has been registered as a verified channel. The authentication token may be presented along with the channel and user identifier of the message of block 722, received at block 725.

At block 735, messaging verification provider module 500 may verify that the authentication token is valid, such as by comparison to authentication token data 320, then verify the channel is registered in registered channel data 305, then generate or access a verification code that is unique to this channel/message recipient combination.

At block 740, messaging verification provider module 500 may return verification instructions and the verification code stored in verification code data 310 records to the messaging service provider module 400.

At block 745, messaging service provider module 400 may return the verification instructions and verification code to the message recipient. E.g., this message may say, "visit the home page of Acme Corp, click on the verify link, and type in this code: 54354A". This would be the 2nd message the message recipient has now received from the "suspect" source, but now the message recipient has a way to verify these messages are from a reputable source so they may no longer view the messages as suspect.

At block 750, verification page provider module 600 may determine that a message recipient has visited the verification page and entered in the verification code they received from the suspect source in block 745.

At block 755, verification page provider module 600 may send the verification code to the message verification provider module 500.

At block 760, messaging verification provider module 500 may verify the supplied verification code matches the one stored in the verification code data 310 records.

At block 761, messaging verification provider module 500 may request from messaging service provider module 400 for summary information regarding communications between messaging service provider module 400 and message recipient 104. The summary information may comprise, for example, the date-time when messages were sent to or from the message recipient, identities of senders of such messages, and the like.

At block 762, messaging service provider module 400 may return the summary information to messaging verification provider module 500.

At block 765, message verification provider module 500 may send and verification page provider module 600 may receive verification information or summary information.

At block 770, verification page provider module 600 may display the verification information or summary received from the message verification provider module 500 on or via the verification page; e.g. the times/message sender identities in relation to messages sent by, for example, messaging service provider 400 at block 722 and block 745 and/or the time message recipient 104 sent a message at block 745. This should verify the source of the suspect messages, thus removing the suspect nature of those messages.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to the logic of the instructions of an app, software, and/or firmware, and/or the logic embodied into a programmable circuitry by a configuration bit stream, to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Following are non-limiting examples of embodiments of the disclosure herein:

Example 1. An apparatus to verify the source of a message, comprising: a computer processor and a memory, and wherein the memory comprises a message verification module; wherein to verify the source of the suspected message, the message verification module is to configure a keyword to trigger a verification flow with a message recipient and register a verified channel for use to send messages to the message recipient, associate the verified channel with an authentication token, transmit a first message containing the keyword to the message recipient via the verified channel, receive a reply from the message recipient containing the keyword and triggering the verification flow; wherein in the triggered verification flow, the message verification module is further to verify the verified channel using the authentication token, determine verification instructions and a code, transmit the verification instructions and the code to the message recipient through the verified channel in a second message, receive the code from the message recipient, and transmit verification information to the message recipient.

Example 2. The apparatus according to Example 1, wherein the message verification module is further to receive an instruction from a customer of the message verification module to transmit the first message to the message recipient over the verified channel.

Example 3. The apparatus according to Example 2, wherein the instruction further comprises a content to include in the first message, wherein the content is in addition to the keyword.

Example 4. The apparatus according to Example 1, wherein to register the verified channel comprises to associate the verified channel with a customer of the message verification module.

Example 5. The apparatus according to Example 1, wherein the verified channel comprises an identifier of a transmitter in a transmission media.

Example 6. The apparatus according to Example 5, the transmission media comprises one of a text transmission media, an audio transmission media, and a video transmission media and wherein the identifier of the transmitter comprises one of a phone number or a user identifier.

Example 7. The apparatus according to Example 5, wherein transmission media comprises at least one of a short message service transmission media or a multimedia messaging service.

Example 8. The apparatus according to Example 1, wherein the message verification module is to receive the code from the message recipient via a webpage, wherein the message recipient input the code into the webpage and the webpage transmitted the code to the message verification module.

Example 9. The apparatus according to Example 1, wherein the verification instructions comprise instructions to the message recipient to access a webpage and input the code into the webpage.

Example 10. The apparatus according to Example 9, wherein the webpage is a webpage of a customer of the message verification module.

Example 11. The apparatus according to Example 10, wherein the webpage of the customer of the message verification module is trusted by the message recipient independently from the first message.

Example 12. The apparatus according to Example 9, wherein to transmit verification information to the message recipient comprises to transmit verification information to the message recipient via the webpage and wherein the verification information comprises summary information for at least one of the first message, the reply from the message recipient, or the second message, wherein the summary information comprises a date-time.

Example 13. The apparatus according to Example 1, wherein the apparatus is a first apparatus, wherein the computer processor and the memory is a first computer processor and first memory of the first apparatus, wherein the message verification module comprises a messaging service provider module, a messaging verification provider module, and a verification page provider module, wherein at least one of the messaging service provider module, the messaging verification provider module, and the verification provider module is stored in and performed by one of the first memory and the first processor, a second memory and a second processor of a second apparatus, or a third memory and a third processor of a third apparatus, and wherein to verify the source of the suspected message, the messaging service provider module is to configure the keyword to trigger the verification flow with the message recipient and register the verified channel for use to send messages to the message recipient with the message verification provider module, the message verification provider module is to associated the verified channel with an authentication token and provide the authentication token to the messaging service provider module, the messaging service provider module is to transmit the first message containing the keyword to the message recipient via the verified channel, receive the reply from the message recipient containing the keyword and triggering the verification flow; wherein in the triggered verification flow, the messaging service provider module is to present the authentication token to the message verification provider module and is to request that the message verification provider module verify the verified channel based on the authentication token, determine at the message verification provider module the verification instructions and the code and transmit the verification instructions and the code to the messaging service provider module, the messaging service provider module is to transmit the verification instruction and the code to the message recipient via the verified channel in the second message, and wherein the verification page provider module is to receive the code from the message recipient and transmit verification information to the message recipient.

Example 14. A computer implemented method to verify the source of a message, comprising: configuring a keyword to trigger a verification flow with a message recipient and registering a verified channel for use to send messages to the message recipient, associating the verified channel with an authentication token, transmitting a first message containing the keyword to the message recipient via the verified channel, receiving a reply from the message recipient containing the keyword and triggering the verification flow; wherein in the triggered verification flow, the computer implement method further comprises verifying the verified channel using the authentication token, determining verification instructions and a code, transmitting the verification instructions and the code to the message recipient through the verified channel in a second message, receiving the code from the message recipient, and transmitting verification information to the message recipient.

Example 15. The method according to Example 14, further comprising receiving an instruction from a customer to transmit the first message to the message recipient over the verified channel.

Example 16. The method according to Example 15, wherein the instruction further comprises a content to include in the first message, wherein the content is in addition to the keyword.

Example 17. The method according to Example 14, wherein registering the verified channel comprises associating the verified channel with a customer.

Example 18. The method according to Example 14, wherein the verified channel comprises an identifier of a transmitter in a transmission media.

Example 19. The method according to Example 18, wherein the transmission media comprises one of a text transmission media, an audio transmission media, and a video transmission media and wherein the identifier of the transmitter comprises one of a phone number or a user identifier.

Example 20. The method according to Example 18, wherein the transmission media comprises at least one of a short message service transmission media or a multimedia messaging service.

Example 21. The method according to Example 14, further comprising receiving the code from the message recipient via a webpage, wherein the message recipient input the code into the webpage and the webpage transmitted the code.

Example 22. The method according to Example 14, wherein the verification instructions comprise instructions to the message recipient to access a webpage and input the code into the webpage.

Example 23. The method according to Example 22, wherein the webpage is a webpage of a customer of the message verification module.

Example 24. The method according to Example 23, wherein the webpage of the customer of the message verification module is trusted by the message recipient independently from the first message.

Example 25. The method according to Example 22, wherein transmitting verification information to the message recipient comprises transmitting verification information to the message recipient via the webpage and wherein the verification information comprises summary information for at least one of the first message, the reply from the message recipient, or the second message, wherein the summary information comprises a date-time.

Example 26. A computer apparatus to verify the source of a message, comprising: means to configure a keyword to trigger a verification flow with a message recipient and register a verified channel for use to send messages to the message recipient, associate the verified channel with an authentication token, transmit a first message containing the keyword to the message recipient via the verified channel, receive a reply from the message recipient containing the keyword and triggering the verification flow; wherein in the triggered verification flow, the means further comprise means to verify the verified channel using the authentication token, determine verification instructions and a code, transmit the verification instructions and the code to the message recipient through the verified channel in a second message, receive the code from the message recipient, and transmit verification information to the message recipient.

Example 27. The apparatus according to Example 26, further comprising receiving an instruction from a customer to transmit the first message to the message recipient over the verified channel.

Example 28. The apparatus according to Example 27, wherein the instruction further comprises a content to include in the first message, wherein the content is in addition to the keyword.

Example 29. The apparatus according to Example 26, wherein registering the verified channel comprises associating the verified channel with a customer.

Example 30. The apparatus according to Example 26, wherein the verified channel comprises an identifier of a transmitter in a transmission media.

Example 31. The apparatus according to Example 30, wherein the transmission media comprises one of a text transmission media, an audio transmission media, and a video transmission media and wherein the identifier of the transmitter comprises one of a phone number or a user identifier.

Example 32. The apparatus according to Example 30, wherein the transmission media comprises at least one of a short message service transmission media or a multimedia messaging service.

Example 33. The apparatus according to Example 26, further comprising receiving the code from the message recipient via a webpage, wherein the message recipient input the code into the webpage and the webpage transmitted the code.

Example 34. The apparatus according to Example 26, wherein the verification instructions comprise instructions to the message recipient to access a webpage and input the code into the webpage.

Example 35. The apparatus according to Example 34, wherein the webpage is a webpage of a customer of the message verification module.

Example 36. The apparatus according to Example 35, wherein the webpage of the customer of the message verification module is trusted by the message recipient independently from the first message.

Example 37. The apparatus according to Example 34, wherein transmitting verification information to the message recipient comprises transmitting verification information to the message recipient via the webpage and wherein the verification information comprises summary information for at least one of the first message, the reply from the message recipient, or the second message, wherein the summary information comprises a date-time.

Example 38. The apparatus according to Example 26, wherein a first computer comprises the means to configure a keyword to trigger a verification flow with a message recipient and register the verified channel for use to send messages to the message recipient, wherein a second computer comprises the means to associate the verified channel with an authentication token, wherein the first computer comprises the means to transmit the first message containing the keyword to the message recipient via the verified channel and receive a reply from the message recipient containing the keyword and triggering the verification flow; wherein in the triggered verification flow, the first computer further comprises the means to verify the verified channel using the authentication token by presenting the authentication token to the second computer, wherein the second computer comprises means to verify the verified channel based on the presented authentication token, wherein the second computer comprises the means to determine the verification instructions and the code, wherein the first computer comprises the means to transmit the verification instructions and the code to the message recipient through the verified channel in a second message, wherein a third computer comprises the means to receive the code from the message recipient and transmit verification information to the message recipient.

Example 39. One or more computer-readable media comprising instructions that cause at least one computer device, in response to execution of the instructions by a processor of the at least one computer device, to: configure a keyword to trigger a verification flow with a message recipient and register a verified channel for use to send messages to the message recipient, associate the verified channel with an authentication token, transmit a first message containing the keyword to the message recipient via the verified channel, receive a reply from the message recipient containing the keyword and triggering the verification flow; wherein in the triggered verification flow, the computer-readable media further comprise instructions that cause the computer device, in response to execution of the instructions by the processor of the computer device, to verify the verified channel using the authentication token, determine verification instructions and a code, transmit the verification instructions and the code to the message recipient through the verified channel in a second message, receive the code from the message recipient, and transmit verification information to the message recipient.

Example 40. The computer-readable media according to Example 39, wherein the instructions further cause the computer device, in response to execution of the instructions by the processor of the computer device, to receive a direction from a customer to transmit the first message to the message recipient over the verified channel.

Example 41. The computer-readable media according to Example 40, wherein the direction further comprises a content to include in the first message, wherein the content is in addition to the keyword.

Example 42. The computer-readable media according to Example 39, wherein to register the verified channel comprises to associate the verified channel with a customer.

Example 43. The computer-readable media according to Example 39, wherein the verified channel comprises an identifier of a transmitter in a transmission media.

Example 44. The computer-readable media according to Example 43, wherein the transmission media comprises one of a text transmission media, an audio transmission media, and a video transmission media and wherein the identifier of the transmitter comprises one of a phone number or a user identifier.

Example 45. The computer-readable media according to Example 43, wherein the transmission media comprises at least one of a short message service transmission media or a multimedia messaging service.

Example 46. The computer-readable media according to Example 39, wherein the instructions further cause a computer device, in response to execution of the instructions by the processor of the computer device, to receive the code from the message recipient via a webpage, wherein the message recipient input the code into the webpage and the webpage transmitted the code.

Example 47. The computer-readable media according to Example 39, wherein the verification instructions comprise instructions to the message recipient to access a webpage and input the code into the webpage.

Example 48. The computer-readable media according to Example 47, wherein the webpage is a webpage of a customer of the message verification module.

Example 49. The computer-readable media according to Example 48, wherein the webpage of the customer of the message verification module is trusted by the message recipient independently from the first message.

Example 50. The computer-readable media according to Example 47, wherein to transmit verification information to the message recipient comprises to transmit verification information to the message recipient via the webpage and wherein the verification information comprises summary information for at least one of the first message, the reply from the message recipient, or the second message, wherein the summary information comprises a date-time.

Example 51. The computer-readable media according to Example 39, wherein the computer device is a first computer device and the processor is a first processor of the first computer device and wherein a first subset of the instructions cause the first computer device, in response to execution of the first subset of the instructions by the first processor of the first computer device, to configure the keyword to trigger the verification flow with a message recipient and to register the verified channel for use to send messages to the message recipient, and wherein a second subset of the instructions further cause a second computer device, in response to execution of the second subset of instructions by a second processor of the second computer device, to associate the verified channel with an authentication token, wherein the first subset of the instructions are to cause the first computer device, in response to execution of the first subset of the instructions by the first processor of the first computer device, to transmit the first message containing the keyword to the message recipient via the verified channel and receive a reply from the message recipient containing the keyword and triggering the verification flow; wherein in the triggered verification flow, the first subset of the instructions are to cause the first computer device, in response to execution of the first subset of the instructions by the first processor of the first computer device, to verify the verified channel using the authentication token by presenting the authentication token to the second computer device, wherein the second subset of the instructions further cause the second computer device, in response to execution of the second subset of instructions by the second processor of the second computer device, to verify the verified channel based on the presented authentication token, and to determine the verification instructions and the code, wherein the first subset of the instructions are to cause the first computer device, in response to execution of the first subset of the instructions by the first processor of the first computer device, to transmit the verification instructions and the code to the message recipient through the verified channel in a second message, wherein a third subset of the instructions are to cause a third computer device, in response to execution of the third subset of the instructions by a third processor of the third computer device, to receive the code from the message recipient and transmit verification information to the message recipient.

The invention claimed is:

1. An apparatus to verify the source of a message, comprising: a computer processor and a memory, and wherein the memory comprises a message verification module; wherein to verify the source of the suspected message, the message verification module is to configure a keyword to trigger a verification flow with a message recipient and register a verified channel for use to send messages to the message recipient, associate the verified channel with an authentication token, transmit a first message containing the keyword to the message recipient via the verified channel, receive a reply from the message recipient containing the keyword and triggering the verification flow; wherein in the triggered verification flow, the message verification module is further to verify the verified channel using the authentication token, determine verification instructions and a code, transmit the verification instructions and the code to the message recipient through the verified channel in a second message, receive the code from the message recipient, and transmit verification information to the message recipient.

2. The apparatus according to claim 1, wherein the verified channel comprises an identifier of a transmitter in a transmission media.

3. The apparatus according to claim 2, wherein the transmission media comprises one of a short message service transmission media, or a multimedia messaging service and wherein the identifier of the transmitter comprises one of a phone number or a user identifier.

4. The apparatus according to claim 1, wherein the message verification module is to receive the code from the message recipient via a webpage, wherein the message recipient input the code into the webpage and the webpage transmitted the code to the message verification module.

5. The apparatus according to claim 1, wherein the verification instructions comprise instructions to the message recipient to access a webpage and input the code into the webpage.

6. The apparatus according to claim 5, wherein to transmit verification information to the message recipient comprises to transmit verification information to the message recipient via the webpage and wherein the verification information comprises summary information for at least one of the first message, the reply from the message recipient, or the second message, wherein the summary information comprises a date-time.

7. The apparatus according to claim 1, wherein the apparatus is a first apparatus, wherein the computer processor and the memory is a first computer processor and first memory of the first apparatus, wherein the message verification module comprises a messaging service provider module, a messaging verification provider module, and a verification page provider module, wherein at least one of the messaging service provider module, the messaging verification provider module, and the verification provider module is stored in and performed by one of the first memory and the first processor, a second memory and a second processor of a second apparatus, or a third memory and a third processor of a third apparatus, and wherein to verify the source of the suspected message, the messaging service provider module is to configure the keyword to trigger the verification flow with the message recipient and register the verified channel for use to send messages to the message recipient with the message verification provider module, the message verification provider module is to associated the verified channel with an authentication token and provide the authentication token to the messaging service provider module, the messaging service provider module is to transmit the first message containing the keyword to the message recipient via the verified channel, receive the reply from the message recipient containing the keyword and triggering the verification flow; wherein in the triggered verification flow, the messaging service provider module is to present the authentication token to the message verification provider module and is to request that the message verification provider module verify the verified channel based on the authentication token, determine at the message verification provider module the verification instructions and the code and transmit the verification instructions and the code to the messaging service provider module, the messaging service provider module is to transmit the verification instruction and the code to the message recipient via the verified channel in the second message, and wherein the verification page provider module is to receive the code from the message recipient and transmit verification information to the message recipient.

8. A computer implemented method to verify the source of a message, comprising: configuring a keyword to trigger a verification flow with a message recipient and registering a verified channel for use to send messages to the message recipient, associating the verified channel with an authentication token, transmitting a first message containing the keyword to the message recipient via the verified channel, receiving a reply from the message recipient containing the keyword and triggering the verification flow; wherein in the triggered verification flow, the computer implement method further comprises verifying the verified channel using the authentication token, determining verification instructions and a code, transmitting the verification instructions and the code to the message recipient through the verified channel in a second message, receiving the code from the message recipient, and transmitting verification information to the message recipient, further comprising receiving an instruction from a customer to transmit the first message to the message recipient over the verified channel, wherein the instruction further comprises a content to include in the first message, wherein the content is in addition to the keyword.

9. The method according to claim 8, wherein registering the verified channel comprises associating the verified channel with a customer.

10. The method according to claim 8, wherein the transmission media comprises at least one of a short message service transmission media or a multimedia messaging service and wherein the identifier of the transmitter comprises one of a phone number or a user identifier.

11. The method according to claim 8, further comprising receiving the code from the message recipient via a webpage, wherein the message recipient input the code into the webpage and the webpage transmitted the code.

12. The method according to claim 8, wherein the verification instructions comprise instructions to the message recipient to access a webpage and input the code into the webpage.

13. The method according to claim 12, wherein transmitting verification information to the message recipient comprises transmitting verification information to the message recipient via the webpage and wherein the verification information comprises summary information for at least one of the first message, the reply from the message recipient, or the second message, wherein the summary information comprises a date-time.

14. One or more computer-readable media comprising instructions that cause at least one computer device, in response to execution of the instructions by a processor of the at least one computer device, to: configure a keyword to trigger a verification flow with a message recipient and register a verified channel for use to send messages to the message recipient, associate the verified channel with an authentication token, transmit a first message containing the keyword to the message recipient via the verified channel, receive a reply from the message recipient containing the keyword and triggering the verification flow; wherein in the triggered verification flow, the computer-readable media further comprise instructions that cause the computer device, in response to execution of the instructions by the processor of the computer device, to verify the verified channel using the authentication token, determine verification instructions and a code, transmit the verification instructions and the code to the message recipient through the verified channel in a second message, receive the code from the message recipient, and transmit verification information to the message recipient.

15. The computer-readable media according to claim 14, wherein the instructions further cause the computer device, in response to execution of the instructions by the processor of the computer device, to receive a direction from a customer to transmit the first message to the message recipient over the verified channel, wherein the direction further comprises a content to include in the first message, wherein the content is in addition to the keyword.

16. The computer-readable media according to claim 14, wherein to register the verified channel comprises to associate the verified channel with a customer.

17. The computer-readable media according to claim 14, wherein the verified channel comprises an identifier of a transmitter in a transmission media, and wherein the transmission media comprises at least one of a short message service transmission media or a multimedia messaging service and wherein the identifier of the transmitter comprises one of a phone number or a user identifier.

18. The computer-readable media according to claim 14, wherein the verification instructions comprise instructions to the message recipient to access a webpage and input the code into the webpage.

19. The computer-readable media according to claim 18, wherein the webpage is a webpage of a customer of the message verification module.

20. The computer-readable media according to claim 18, wherein to transmit verification information to the message recipient comprises to transmit verification information to the message recipient via the webpage and wherein the verification information comprises summary information for at least one of the first message, the reply from the message recipient, or the second message, wherein the summary information comprises a date-time.

\* \* \* \* \*